United States Patent
Heidorn

(10) Patent No.: US 7,481,371 B2
(45) Date of Patent: Jan. 27, 2009

(54) RFID ENCODED INKJET LABEL AND METHOD

(75) Inventor: Craig Leonard Heidorn, Belleville, IL (US)

(73) Assignee: Illinois Tool Works, Inc., Chicago, IL (US)

( * ) Notice: Subject to any disclaimer, the term of this patent is extended or adjusted under 35 U.S.C. 154(b) by 217 days.

(21) Appl. No.: 11/162,585

(22) Filed: Sep. 15, 2005

(65) Prior Publication Data

US 2007/0057053 A1    Mar. 15, 2007

(51) Int. Cl.
*G06F 17/00* (2006.01)
(52) U.S. Cl. .......................... 235/462.15; 235/462.01; 235/487; 235/492
(58) Field of Classification Search .......... 235/462.15, 235/462.01, 487, 494
See application file for complete search history.

(56) References Cited

U.S. PATENT DOCUMENTS

| | | | |
|---|---|---|---|
| 5,427,029 A * | 6/1995 | Dumke | 101/484 |
| 6,280,544 B1 | 8/2001 | Fox | |
| 6,409,401 B1 | 6/2002 | Petteruti | |
| 6,827,279 B2 * | 12/2004 | Teraura | 235/492 |
| 7,114,654 B2 * | 10/2006 | Chapman et al. | 235/462.01 |
| 7,223,030 B2 * | 5/2007 | Fessler et al. | 400/76 |
| 2006/0131377 A1 * | 6/2006 | Zimmerman | 235/375 |

FOREIGN PATENT DOCUMENTS

| | | |
|---|---|---|
| AU | 743556 | 1/2002 |
| DE | 20 2004 007371 | 7/2004 |
| EP | 1587019 | 10/2005 |
| WO | 2005028203 | 3/2005 |

OTHER PUBLICATIONS

PCT International Search Report for PCT/US2006/030452 dated Dec. 11, 2006.

* cited by examiner

*Primary Examiner*—Seung H Lee
(74) *Attorney, Agent, or Firm*—Mark W. Croll; Donald J. Breh; Levenfeld Pearlstein, LLC

(57) ABSTRACT

An identification system for an object includes a radio frequency identification tag formed as a label. The tag is encoded so as to contain information regarding the object. The label has indicia printed thereon corresponding to the encoded information. The information encoded on the radio frequency identification tag corresponds to the indicia printed on the label so as to provide multiple forms of identification for the object. A method for providing identification to an object is also disclosed.

19 Claims, 1 Drawing Sheet

RFID ENCODED INKJET LABEL AND METHOD

BACKGROUND OF THE INVENTION

The present invention relates to a radio frequency identification (RFID) label printer applicator system and method. More particularly, the present invention pertains to a label printer applicator system that is capable of encoding, applying and printing RFID labels to objects.

Automated RFID encoding label printer applicators are known in the art. Such a machine encodes an RFID tag or label, prints a bar code on that label and applies that label to an object such as a package. The RFID encoding and bar code printing is carried out in a serial, side-by-side manner so as to ensure that the bar codes and the RFID information are consistent (that is, to ensure that the information printed on a tag or label is the same as that which is reflected in the RFID information). In such known applicators the bar code printing is provided by thermal print engines.

These known automated systems can process about 80 package per minute (ppm). While such a system functions well, it does not meet the processing requirements of today's industries. Accordingly, there is a need for a system that encodes, prints and applies tags (or labels) to packages. Desirably, such a system can operate at speeds greater than known package processing operations.

BRIEF SUMMARY OF THE INVENTION

An identification system for an object includes a radio frequency identification (RFID) tag formed as a label. The tag is encoded so as to contain information regarding the object. The label has indicia, preferably a barcode, printed thereon corresponding to the encoded information. The information encoded on the radio frequency identification tag corresponds to the indicia printed on the label so as to provide multiple forms of identification for the object. The printed indicia can also contain non-barcode information.

In a present system, the indicia is printed by an inkjet printer. The printing can be carried out after the RFID tag is encoded and applied to the object (e.g., package). That is, the label is encoded and applied to the package and is then printed (as it is applied to the package).

The barcode information can correspond to the tag encoding. The barcode information can be printed based upon information received from the encoded tag.

The indicia can be variable data (e.g., changeable from one label or package to the next). In such an application, the label can also include fixed data printed thereon prior to encoding.

A system for encoding a label having a radio frequency identification tag, applying the label to an object and printing on the label includes an encoder for encoding information on the radio frequency identification tag, a label applicator to apply the label to the object and a printer to print information on the label. In a preferred system, the printer is an inkjet printer. Preferably, the encoder precedes the applicator and the applicator precedes the printer.

A method for providing identification to an object includes the steps of encoding identification information on a radio frequency identification tag formed as a label, applying the label to an object and inkjet printing indicia on the label corresponding to the encoded information.

In a presently contemplated method, the indicia is printed on the label after the label is applied to the object and the indicia is printed, at least in part, as a barcode. In a present system, reading the encoded information from the radio frequency identification tag and printing indicia on the label can be based, at least in part, from the information read from the tag.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
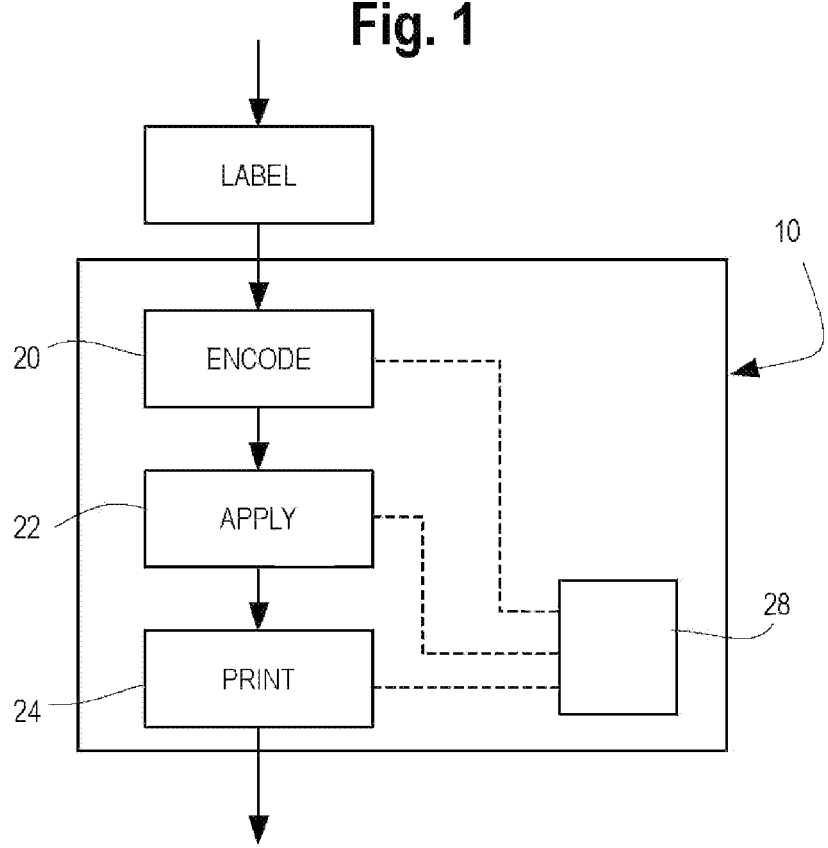
FIG. 1 is a flow diagram of the encoding-applying-printing process in accordance with the present invention.
Figure 2:
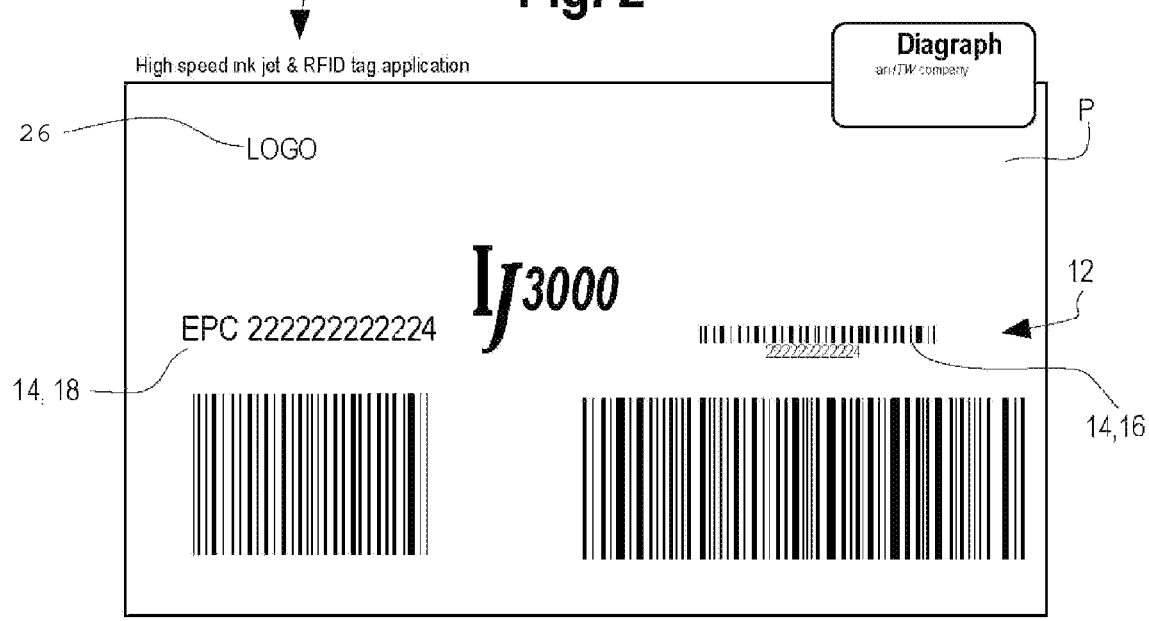
FIG. 2 illustrates an exemplary package having multiple RFID encoded inkjet labels affixed thereto.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

The present invention pertains to an improved label printer applicator system 10 and method. According to the present printer and method, radio frequency identification tags, formed as labels 12, are encoded, applied to packages P and printed with identifying information 14 such as bar code 16 or other 18 product information.

The system 10 includes an encoder 20, such as an RFID engine to encode the individual tags or labels 12 with the desired product information. The system 10 further includes an applicator 22 to apply the individual tags or labels 12 to the packages P. The system 10 also includes a printer 24, specifically an ink jet printer, to print the desired information 14 or indicia (such as a bar code) on the label 12.

The labels 12 can be preprinted with fixed indicia 26 or information, for example, a company name, trademark or logo. The present system 10 printer, though, provides the ability to print variable data 14 on the individual labels 12. That is, in an in-line process, the present system 10 includes a controller 28 that provides the ability to change the information 14 printed from one label 12 to the next. For example, if the barcode information changes from one label (or package) to the next to identify a product serial number or to provide specific package information, the controller 28 of the present system 10 can identify and designate to such a change and print the desired information.

The labels 12 are applied to the packages or objects P by an applicator 22. Such applicators 22 are well known in the art. In a present system 10, subsequent to the application of the label 12, specific (and perhaps variable data) print 14 is applied to the label 12. A present print 14 application (or indicia) is a bar code. It will be appreciated that the bar code includes any of a variety of desired information regarding the product, package or the like.

Unlike known systems, the present system 10 employs an ink jet printer 24 (known system use thermal printers). It has been found that the ink jet printer 24 provides the necessary speed and flexibility required to meet processing demands.

In the present system 10, unlike known labeling (or tagging) systems, the printed indicia or bar code 14 is applied after the RFID label 12 is applied to the package P. In this manner, the bar code information 14 can be printed based upon information (a signal) that is received from the RFID tag 12.

It has been found that the present system 10 permits package P throughput rates that are significantly higher than known encode-print-apply machines. In fact, throughput (measured in packages per minute (ppm)) has been found to increase by about 50 percent from about 80 ppm to about 120 ppm.

Moreover, the present system 10 not only increases throughput, but also provides flexibility not previously known. There are numerous contemplated operating schemes by which the present system 10 can be operated. For example, it is anticipated that the labels 12 can be encoded and applied to a package P and then subsequently (immediately or at a later time) printed with the desired data 14. The data for printing can be derived from stored (e.g., machine stored) information or from information read from the encoded label 12.

It is also anticipated that the label 12 can be applied to the package P and at a later time the label can be encoded and printed. Again, the information for printing 14 can be gleaned from the encoded label 12 or from machine stored information. It will be appreciated by those skilled in the art that a wide variety of different encoding-applying-printing scenarios can be carried out using the present system.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be made to the invention without departing from the true spirit and scope of the novel concepts of the present invention. It is to be understood that no limitation with respect to the specific embodiments illustrated is intended or to be inferred. The disclosure is intended to cover all such modifications as fall within the scope of the invention.

What is claimed is:

1. An identification system for an object comprising:
   a radio frequency identification tag formed as a first label, the tag being encoded so as to contain information regarding the object, the first label having indicia printed thereon corresponding to the encoded information, wherein the information encoded on the radio frequency identification tag corresponds to the indicia printed on the first label so as to provide multiple forms of identification for the object; and
   a controller providing the ability to change the information printed from the first label to a next label based on the encoded information in the radio frequency identification tag.

2. The identification system in accordance with claim 1 wherein the indicia is in the form of a barcode.

3. The identification system in accordance with claim 2 wherein the indicia further includes non-barcode information.

4. The identification system in accordance with claim 2 wherein the barcode information corresponds to the tag encoding.

5. The identification system in accordance with claim 2 wherein the barcode information is printed based upon information received from the encoded tag.

6. The identification system in accordance with claim 1 wherein the indicia is inkjet printed on the label.

7. The identification system in accordance with claim 6 wherein the indicia is variable data and wherein the label includes fixed data printed therein prior to encoding.

8. The identification system in accordance with claim 1 wherein the labels are applied to the objects at a rate greater than 80 objects per minute.

9. A system for encoding a label having a radio frequency identification tag, applying the label to an object, and printing on the label, the system comprising:
   an encoder for encoding information on the radio frequency identification tag;
   a label applicator to apply the label to the object;
   a controller providing the ability to change the information printed from a first label to a next label based on the information of the radio frequency identification tag; and
   a printer to print information on the label.

10. The system in accordance with claim 9 wherein the printer is an inkjet printer.

11. The system in accordance with claim 9 wherein the encoder precedes the applicator.

12. The system in accordance with claim 9 wherein the applicator precedes the printer.

13. The system in accordance with claim 9 wherein the encoder precedes the printer.

14. The system for encoding a label in accordance with claim 9 wherein the label applicator applies the labels at a rate greater than 80 objects per minute.

15. A method for providing identification to an object comprising the steps of:
   encoding identification information on a radio frequency identification tag formed as a label;
   applying the label to an object;
   determining indicia to be printed based on the label based on the encoded information on the radio frequency identification tag; and
   inkjet printing the indicia on the label corresponding to the encoded information.

16. The method in accordance with claim 15 wherein the indicia is printed on the label after the label is applied to the object.

17. The method in accordance with claim 15 wherein the indicia is printed, at least in part, as a barcode.

18. The method in accordance with claim 16 including the step of reading the encoded information from the radio frequency identification tag and wherein the indicia printed on the label is based, at least in part, from the information read from the tag.

19. The method in accordance with claim 15 wherein the label is applied to the object at a rate greater than 80 objects per minute.

* * * * *